United States Patent
Aggarwal et al.

(10) Patent No.: US 6,381,444 B1
(45) Date of Patent: Apr. 30, 2002

(54) INTERACTIVE MULTIMEDIA VIRTUAL CLASSES REQUIRING SMALL ONLINE NETWORK BANDWIDTH

(75) Inventors: Alok Aggarwal, Chappaqua, NY (US); Rema Ananthanaratanan, New Delhi (IN); Vipul Bansal, New Delhi (IN); Krishna Kummamuru, New Delhi (IN); Parul A Mittal, New Delhi (IN); Natwar Modani, New Delhi (IN); Sreerama K Murthy, Mumbai (IN); Atrayee Roychowdhury, New Delhi (IN); Satuloori Sridhar, Andhra Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/614,420

(22) Filed: Jul. 12, 2000

(51) Int. Cl.[7] .................................................. G09B 3/00
(52) U.S. Cl. ...................................... 434/350; 434/236
(58) Field of Search ................................ 434/350, 322, 434/323, 236

(56) References Cited

U.S. PATENT DOCUMENTS

| | | | | |
|---|---|---|---|---|
| 5,263,869 A | * | 11/1993 | Ziv-El | 434/336 |
| 5,295,836 A | * | 3/1994 | Ryu et al. | 434/335 |
| 5,303,042 A | * | 4/1994 | Lewis et al. | 348/14.01 |
| 5,437,555 A | * | 8/1995 | Ziv-El | 434/336 |
| 5,458,494 A | * | 10/1995 | Krohn et al. | 434/336 |
| 5,537,141 A | * | 7/1996 | Harper et al. | 725/116 |
| 5,850,250 A | * | 12/1998 | Konopka et al. | 348/14.07 |
| 5,915,973 A | * | 6/1999 | Hoehn-Saric et al. | 434/350 |
| 5,923,844 A | * | 7/1999 | Pommier et al. | 709/205 |
| 5,948,022 A | * | 9/1999 | Carleton et al. | 700/204 |
| 5,974,446 A | * | 10/1999 | Sonnenreich et al. | 709/204 |
| 5,996,002 A | * | 11/1999 | Katsurabayahi et al. | 709/204 |
| 6,002,915 A | * | 12/1999 | Shimizu | 434/350 |
| 6,149,441 A | * | 11/2000 | Pellegrino et al. | 434/350 |
| 6,155,840 A | * | 12/2000 | Sallette | 434/323 |

\* cited by examiner

Primary Examiner—Joe H. Cheng
Assistant Examiner—Kathleen M. Christman
(74) Attorney, Agent, or Firm—Whitham Curtis Christofferson, P.C.; Stephen C. Kaufman

(57) ABSTRACT

A system for implementing a virtual class and distance education via a computer network is disclosed. The process carried out by the system involves receiving signals from one or more instructor entities, the signals including lesson material designated as belonging to one or more interest groups. The lesson material is sent in advance to student entities listed in one or more of the interest groups to which the lesson material is designated as belonging. Signals from one or more student entities are received requesting admission to a particular class and instructions are sent to student entities to control the display and execution of the lesson material. Interaction amongst student entities, or between student entities and instructor entities, are facilitated and moderated.

66 Claims, 6 Drawing Sheets

INTERACTIVE MULTIMEDIA VIRTUAL CLASSES REQUIRING SMALL ONLINE NETWORK BANDWIDTH

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates generally to distance education and, in particular, to providing virtual interactive multimedia training classes.

BACKGROUND

Distance education is becoming increasingly important. Factors such as the limited availability of quality teachers, globalization of institutions and corporations, importance of skill updating and self-learning, versatility of the Internet medium in supporting multimedia lessons, and an increase in part-time and continuing education have led to the popularity of distance learning and training.

Conventional computer implemented distance education discusses electronic classrooms, remote examinations and Internet based learning. Examples of such distance education techniques are described in United States patents:

U.S. Pat. No. 5,537,141 issued on Jul. 16, 1996 to Harper et al. and entitled "Distance learning system providing individual television participation, audio responses and memory for every student";

U.S. Pat. No. 5,850,250 issued on Dec. 15, 1998 to Konopka et al. and entitled "Video distance learning system";

U.S. Pat. No. 4,785,472 issued on Nov. 15, 1988 to Shapiro and entitled "Remote teaching system";

U.S. Pat. No. 5,3030,42 issued on Apr. 12, 1994 to Lewis et al. and entitled "Computer-implemented method and apparatus for remote educational instruction";

U.S. Pat. No. 5,458,494 issued on Oct. 17, 1995 to Krohn et al. and entitled "Remotely operable teaching system and method therefor"; and U.S. Pat. No. 5,915,973 issued on Jun. 29, 1999 to Hoehn-Saric et al. and entitled "System for administration of remotely-proctored, secure examinations and methods therefor".

The following documents deal with online collaboration:

U.S. Pat. No. 5,996,002 issued on Nov. 30, 1999 to Katsurabayashi et al. and entitled "Collaborative work support system and method to facilitate the process of discussion in a meeting using a shared window";

U.S. Pat. No. 5,948,022 issued on Sep. 7, 1999 to Carleton et al. and entitled "Remote collaboration system"; and U.S. Pat. No. 5,923,844 issued on Jul. 13, 1999 to Pommier et al. and entitled "Remote collaboration among host computer running host program and remote computers each running application program".

Existing computer implementations of distance education work as follows: the instructor places lesson material on a server computer. This material may consist of presentations, video of live classrooms, data, audio, etc. The students access the server through the Internet or intranet, and read the material at their leisure. The instructor may schedule "chat sessions", during which the instructor and the students can discuss (typically through typewritten interaction) aspects of the lesson material. Alternatively, remote education may happen on a dedicated high bandwidth network where live classrooms from one location are shown at remote locations through streaming video. The students may interact with the teacher over telephone. Questions in examinations are typically multiple-choice and typewritten.

Existing computer implementations of distance education fall short of real world classrooms. These deficiencies impact the quality of learning and training, and also the business aspects of education. In a real world classroom, classes happen at specified times and allow students to interact with the teacher and peers. The school can charge students tuition fees for classes attended. Students ask voice-based questions in real-time to the teacher, who then responds to that one student or to the whole class. Students talk to each other during the class. The teacher customises lesson delivery according to the students present in the class and teachers can pay special attention to students who have special needs or requirements.

Retaining the advantages of real world classrooms in computer implemented distance education is difficult. This is particularly true in cases where appropriate network infrastructure is lacking, for example in developing nations like India. The interactivity and rich content which good virtual classrooms should have require large bandwidth. Bandwidth is expensive, unreliable or simply unavailable in developing nations. The available bandwidth is shared among many users, so supporting high quality distance education in peak times becomes difficult and expensive.

Conventional techniques fail to accurately replicate real world learning environments in low bandwidth environments. Real-time presentation of content-rich lesson material is restricted to environments with dedicated high bandwidth networks. Low bandwidth environments are typically restricted to limited typewritten interaction between the instructor and students. There is a need for content-rich distance education in low bandwidth environments.

DISCLOSURE OF THE INVENTION

The aspects of the invention include a method and an implemented system for distance education. The method facilitates high quality interactive virtual classes, which provide the versatility of real world classrooms, to be implemented within online bandwidth constraints.

Multimedia-rich lessons comprising video, audio and text are sent to the student ("client") by the instructor from a server. The lessons may be transmitted at any time prior to the commencement of the class, preferably during non-peak usage hours of the network. Students join classes that are scheduled at specific times by requesting admission. During the class, multimedia content that is locally resident on the client is remotely controlled by the instructor, providing rich multimedia interactivity. The control parameters and live interaction are carefully designed to require small bandwidth. By minimizing the amount of information transmitted whilst the training session is in progress, high quality distance education is able to be implemented in low bandwidth settings. Furthermore, voice based interaction and multimedia lessons obviate the need for literacy, enabling the method to be used for health education, vocational training, etc. of illiterate people.

The current invention may be used for the additional purpose of online collaboration.

A specific embodiment of the invention is implemented using satellite broadcast as a high bandwidth forward channel, and low bandwidth telephone connection as a reverse link. Student to instructor interaction is voice and text based, while instructor to student interaction is text, audio or control of remote audio/video/presentation files.

It is an object of the present invention to substantially overcome, or at least ameliorate, one or more disadvantages of existing arrangements.

According to a first aspect of the invention, there is provided a method for distance education via a computer network comprising the steps of:

receiving signals from one or more instructor entities, the signals including lesson material, the lesson material designated as belonging to one or more interest groups;

sending lesson material in advance to student entities listed in one or more of the interest groups to which the lesson material is designated as belonging;

receiving signals from one or more student entities requesting admission to a particular class; and sending instructions to student entities to control the display and execution of the lesson material.

According to a second aspect of the invention, there is provided apparatus for distance education via a computer network comprising:

means for receiving signals from one or more instructor entities, the signals including lesson material, the lesson material designated as belonging to one or more interest groups;

means for sending lesson material in advance to student entities listed in one or more of the interest groups to which the lesson material is designated as belonging;

means for receiving signals from one or more student entities requesting admission to a particular class; and means for sending instructions to student entities to control the display and execution of the lesson material.

According to another aspect of the invention, there is provided a computer program product having a computer usable medium having a computer readable program code means embodied therein, said computer program product comprising:

computer readable program code means for receiving signals from one or more instructor entities, the signals including lesson material, the lesson material designated as belonging to one or more interest groups;

computer readable program code means for sending lesson material in advance to student entities listed in one or more of the interest groups to which the lesson material is designated as belonging;

computer readable program code means for receiving signals from one or more student entities requesting admission to a particular class; and computer readable program code means for sending instructions to student entities to control the display and execution of the lesson material.

BRIEF DESCRIPTION OF THE DRAWINGS

Several embodiments of the present invention are described hereinafter with reference to the drawings, in which.

DETAILED DESCRIPTION INCLUDING BEST MODE

A preferred embodiment provides a method, apparatus and computer program product for distance education. Virtual classes described herein may be used for any purpose, including but not limited to: primary, secondary, or high school classes, college courses, professional courses, continuing education for working people, corporate training and skills training.

In this description, a student entity may refer to a student, a student machine or a computer being used by a student, and each of the terms may be used interchangeably. Similarly, an instructor entity may refer to a teacher, a teacher machine, an instructor or a computer being used by a teacher or an instructor, and each of the terms may be used interchangeably.

Figure 1A:
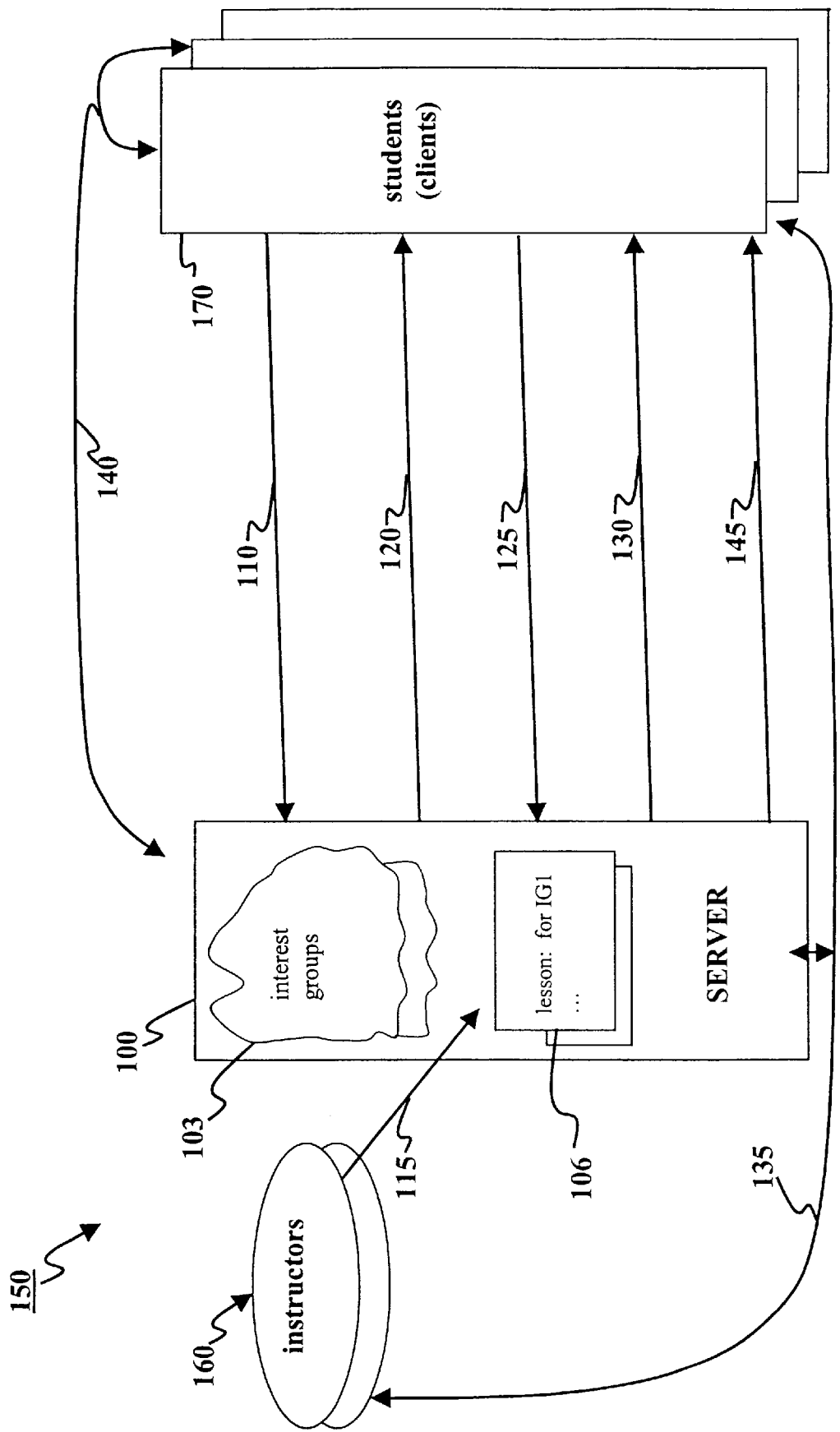
FIG. 1A is a schematic block diagram representing a system for implementing a virtual classroom and distance education, according to an embodiment of the invention.
Figure 1B:
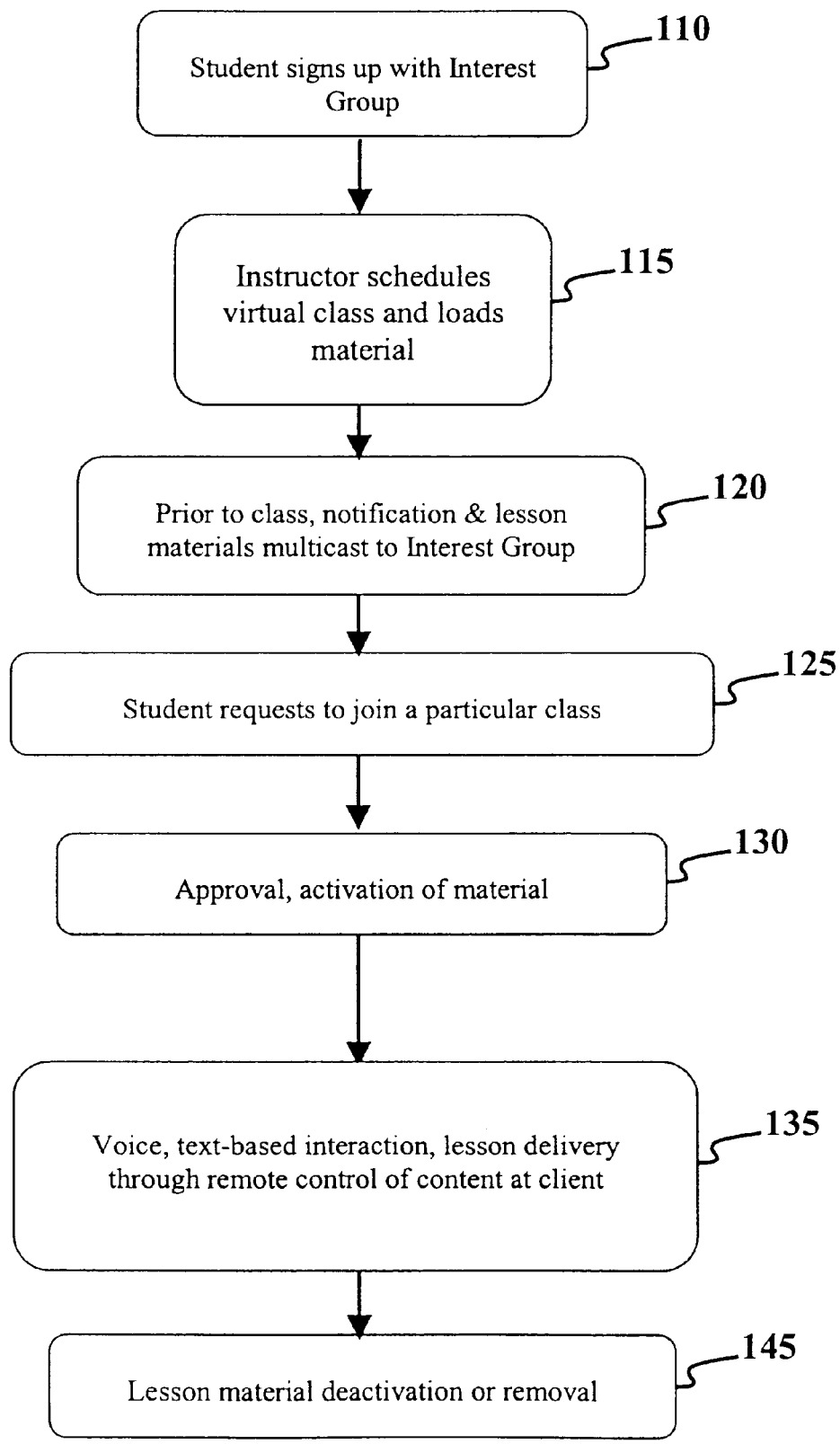
FIG. 1B is a flow diagram of the process of the distance education carried out by the system shown in FIG. 1A.

FIG. 1A shows schematically a system for implementing a virtual class 150 and distance education. FIG. 1B shows the corresponding process that is implemented using the system of FIG. 1A. The steps of FIG. 1B are indicated in FIG. 1A with relation to the system by the use of directed arrows with corresponding reference numerals.

The virtual class 150 consists of three modules: students 170, a central server computer 100 and instructors 160. Peer interaction 140 may occur at any time, as happens in a real classroom environment. The students 170 may interact 140 with other students 170 via a direct connection. Peer interaction 140 may also be enabled via connections from the students 170 to the server 100.

The instructors 160 are connected to the server 100. As the server 100 is interconnected to the instructors 160 and the students 170, the server 100 is able to facilitate interaction between the instructors 160 and the students 170.

The central server computer 100 acts as a repository of interest groups 103 and lessons 106. Each interest group 103 is a register of students 170 having a common interest. Each of the lessons 106 is a virtual class to be delivered and may be used for one or more of the interest groups 103.

Students 170 register in step 110 of FIG. 1B with one or more of the interest groups 103 located on the server 100. The interest groups 103 on the server 100 may be formed by instructors 160 or by institutions which coordinate the activities of the instructors 160. When a student 170 registers 110 with an interest group 103, the student 170 explicitly permits the server 100 to send notifications and lesson materials for classes 106 intended for the interest group 103 with which the student 170 has just registered. There is no compulsion for a student 170 to attend all virtual classes 106 associated with an interest group 103 with which the student 170 is registered.

In the second step 115 of FIG. 1B, an instructor 106 schedules a virtual class and loads material on to the server 100 in the form of lessons 106. Each of the lessons 106 is offered by one or more instructors 160 on a specific day and time. Only instructors 160 are provided with authorisation privileges on the server 100 to schedule virtual classes 106.

An interface is provided in step 115 between the instructors 160 and the server 100 and enables the instructors 160 to enter details about a class 106. Such details include a class title, name of the instructors 160, time of the class 106, lesson materials for the class and the list of interest groups 103 on the server 100 for which the lesson 106 is intended.

In step 120 of FIG. 1B, the central server 100 transfers all relevant lesson materials associated with the class 106 to the relevant student client machines prior to the commencement of each scheduled virtual class 106. The timing for the transmission of lesson materials to the students 170 is decided automatically by the server 100 based on network traffic. As lesson materials are typically large, lesson materials may advantageously be sent in off-peak hours when network traffic is low. In a preferred embodiment, lesson material may be compressed and encrypted with a unique key unknown to the student. This enables the instructor 160 or the server 100 to control access to the educational material even after the educational material has been delivered to the students 170. A particular student 170 may have lesson materials for many classes 106 resident on the student's machine.

The server 100 may also send notification to students 170 about classes 106 that are to commence in the near future in step 120. As the notifications do not require large bandwidth, the notifications may be sent at a specific time each day and are not network traffic dependent. In another embodiment, a notification screen may be maintained on the server 100, which can be accessed by the students 170 at their convenience to check which classes are scheduled. The appearance of the notification screen may be customised dynamically for each student 170 in accordance with the interest groups to which the student 170 belongs.

In step 125 of FIG. 1B, the student 170 requests admission to a specific virtual class 125. The request is processed by the server 100 and/or the instructor 160 and admission may be granted. Admission to the class 106 may be denied due to any number of factors including non-payment or restricted class size. In the embodiment where there is a notification screen, a student 170 wishing to join a particular virtual class 106 visits the notification screen on the central server 100 or on the student's local machine and requests permission to join the class 106.

In step 130 of FIG. 1B, the server 100 or instructor 160 transmits a message to the student 170 enabling activation of the lesson material transmitted in step 120. In the preferred embodiment where encryption is used, the server 100 or instructor 160 transmits a decryption key to the student 170 to activate the lesson material for the particular class.

In step 135 of FIG. 1B, voice or text-based interaction is enabled between the instructor 160 and students 170. The instructor 160 is able to remotely control the display of lesson materials on the student's 170 machine, through the server 100. The instructor 160 can start playing a video of the class on the left top corner of the screen, show a slide presentation on the right top corner or advance the video or the slides at a pace the instructor determines. Any additional software required to display the lesson materials, which may not be present on the student machine, may be transferred from the server 100.

The method allows for the customisation of the presentation for different students. Aspects of the class which are common across classes or students are programmed into the server 100 so as to reduce the work load on the instructor 160 during the class. The interaction 135 from the instructor 160 to the students 170 to control the display of lesson materials typically comprises simple commands with parameters, requiring very little bandwidth. During the class 106, the student 170 may ask the instructor 160 questions and receive responses 135. Compressed audio or text-based interaction does not require high bandwidth, so the student-instructor interaction may be voice-based or typewritten. Advantages of voice based interaction are that it is natural (i.e., happens in real classrooms), and does not require the students to be computer savvy or even literate. In a preferred embodiment, a virtual class interface to the student 170 has a button labelled "ask a question". When this button is clicked, an interface for voice based or text-based interaction pops up, so that the student 170 can formulate and submit a question. If a high bandwidth channel is available, live video and/or audio streaming may be used, further enhancing the virtual class 106.

In step 145, the student 170 quits the virtual class and the lesson material may be deactivated or removed from the student 170. In the preferred embodiment where encryption is used, the lesson material may be encrypted again. The decision to encrypt the material or remove the material may be influenced by factors like pricing mechanisms and space availability.

Figure 2:
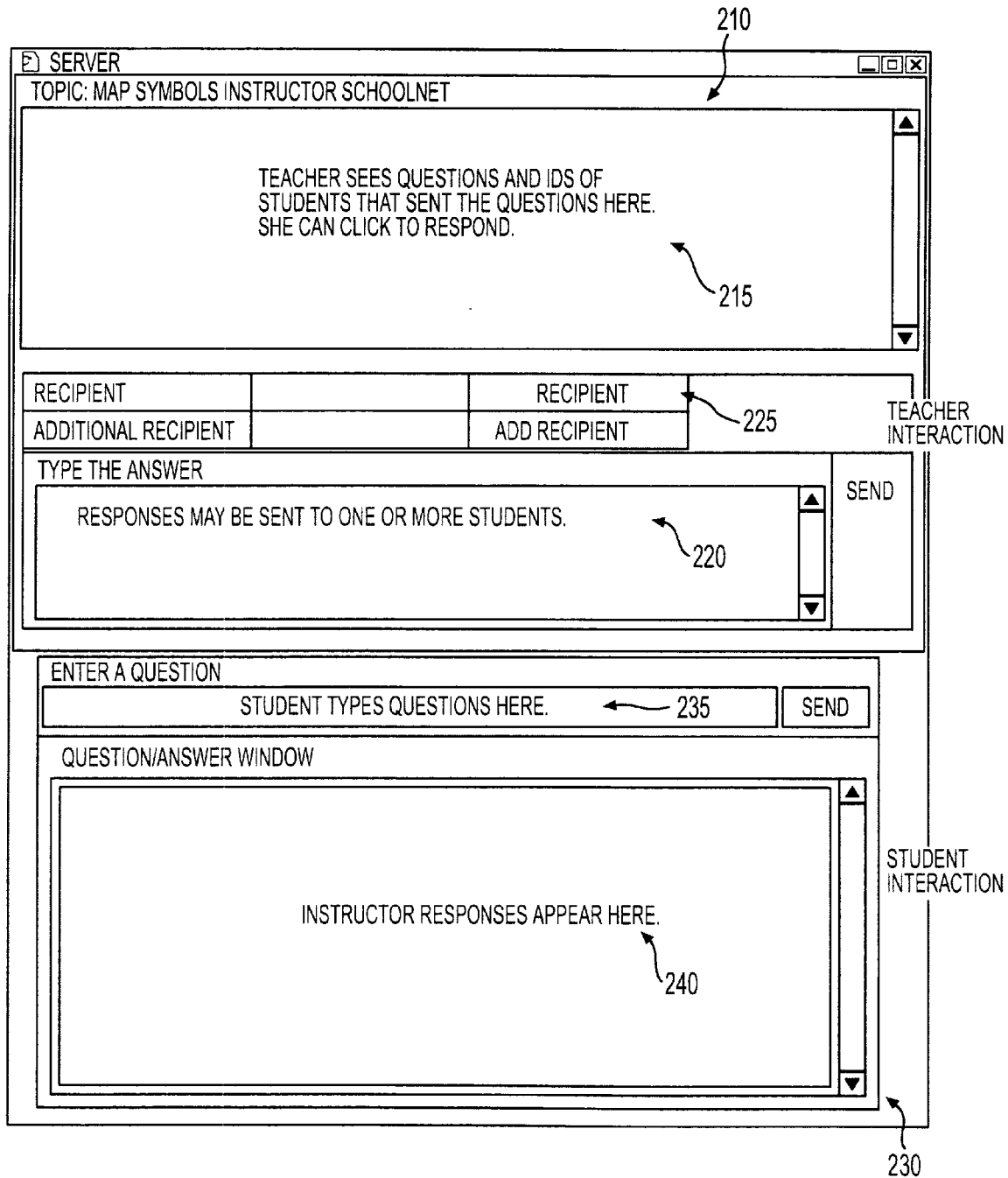
FIG. 2 is a screenshot illustrating an interface for type-written on-line instructor-student interaction for the system and method of FIG. 1.

FIG. 2 shows sample interfaces for text-based interaction, for the instructor 160 and student 170. A first pane 210 depicts a view presented to an instructor 160. A first window 215 displays questions received from students 170 and means for identifying the students 170 who sent the questions. A second window 220 allows an instructor 160 to type in responses to the questions displayed in the first window 215. An interface 225 is provided to allow the instructor 160 to address the response to one or more students 170, as appropriate.

A second pane 230 shows a view presented to a student 170. A window 235 is provided to enable the student 170 to input questions. Responses sent from an instructor 160 appear in a further window 240.

The panes 210 and 230 appear contemporaneously to the instructor 160 and students 170, respectively. The text-based interaction thus provided enables real-time interaction to occur between an instructor 160 and students 170.

A virtual class by default proceeds undisturbed on all the student machines as any one student 170 formulates a question. Voice based questions are recorded as data, compressed and transferred to the instructor 160. The instructor 160 receives questions from any of the students 170, hears/reads them, and chooses the questions to which a response shall be sent. The response may be sent to a single student 170, a subset of students 170 or to the whole group. The instructor 160 formulates responses to selected questions, temporarily pauses the lesson on selected student machines, transmits the responses and resumes the lesson materials. Responses can include voice clips, typed material, commands to rewind/display/restart parts of the lesson material, etc.

If the forward bandwidth (instructor to student) is large, rich multimedia responses can be sent. Even if the forward bandwidth is not large, multimedia responses can be sent as part of the lesson material, and in response to the questions, only control commands to play the responses need to be sent. (Instructors 160 typically can and do expect a majority of the questions that students 170 are likely to ask.)

Online peer interaction (student to student) 140 also forms part of this invention. Voice or typewritten interaction can happen between two students 170, in the same way interaction takes place between a student 170 and an instructor 160. The main difference is that the present invention does not assume that students 170 are connected to, or even know of, each other. Students 170 communicate through the server 100, which knows which students 170 are attending which class 106, locations and academic levels of students 170 and the times a student 170 joined the current class 106. The server 100 thus makes intelligent suggestions to the student 170 as to who would be an appropriate peer with whom to chat. The student 170 is at liberty to ignore the server's 100 suggestion and choose a peer to chat with at the student's own discretion.

When a student 170 requests to join a class which has already started, the following alternative actions can be taken by the instructor 160 or the server 100:

(1) the late arriving student 170 may be denied admission to the class 106;

(2) display of lesson materials are started from the local client time, giving the student 170 a feeling of joining the class 106 in the middle, even though the whole material is locally resident;

(3) same as 2, but additionally the lesson materials up to the point the student 170 joined are displayed contemporaneously in a separate window, so that the student 170 can catch up;

(4) same as 2, but additionally the server identifies another student 170 in the class 106 that has been present from the beginning, and starts a peer interaction (chat) session, to help the late arriving student 170 catch up; and (5) last but not least, the extra help provided to late arriving students 170 can be charged suitably.

In essence, the proposed method opens many possibilities for customisation and targeted education, primarily because students 170 initiate joining interest groups 103 and joining classes 106. Some customisation capabilities are illustrated above with the example of a latecomer to a class. Those skilled in the art can implement other customisations, such as dynamically altering the pace of instruction based on student level, targeted examinations and targeted advertisements.

The present invention also facilitates conducting time-bound, interactive exercises, quizzes and examinations. Methods described so far in embodiments of the invention can be used to measure and control when a student 170 joins an examination, how much time the student 170 takes to answer questions, what interaction the student 170 has with the instructor 160 and other students 170, whether the student 170 responds through speech or not. Utilising these capabilities, versatile virtual examinations can be implemented by those skilled in the art. A specific embodiment, for example, can contain voice-based multiple choice questions in which the time allotted for answering each question is limited and those answering first are rewarded.

A specific embodiment of the above distance education scheme is described. The purpose of the built and tested scheme was twofold:

(1) to provide remote training to primary and secondary school teachers, who themselves have post-secondary education;

(2) to provide distance education to $5^{th}$ grade children in History, Botany and English.

An instructor in the embodiment works on the central server computer itself. A forward link from the instructor to a student is through addressable satellite broadcasting. This channel provides high bandwidth during off-peak times, but may be crowded in the peak time. A reverse link from the student to the instructor is via a dialup modem. Some student machines are personal computers with a satellite receiving card and a modem, while others are televisions with set top boxes that contain the modem and satellite receiver card. Student PCs are multimedia ready, having microphones and speakers for voice-based interaction. For the TV clients, microphones are built into the remote control or the set top box, and the TV speakers are used. A miniature keyboard may be built into the back of the remote, if the interface requires typing. Lesson material consists of videos of real classrooms, educational documentary videos, slide presentations and HTML pages. The content is resident on the student machines and is remotely controlled by the instructor. Instructor-student interaction can either be voice- or text-based. FIG. 2 shows exemplary interfaces for text-based interaction, for the student and the instructor.

Figure 3A:
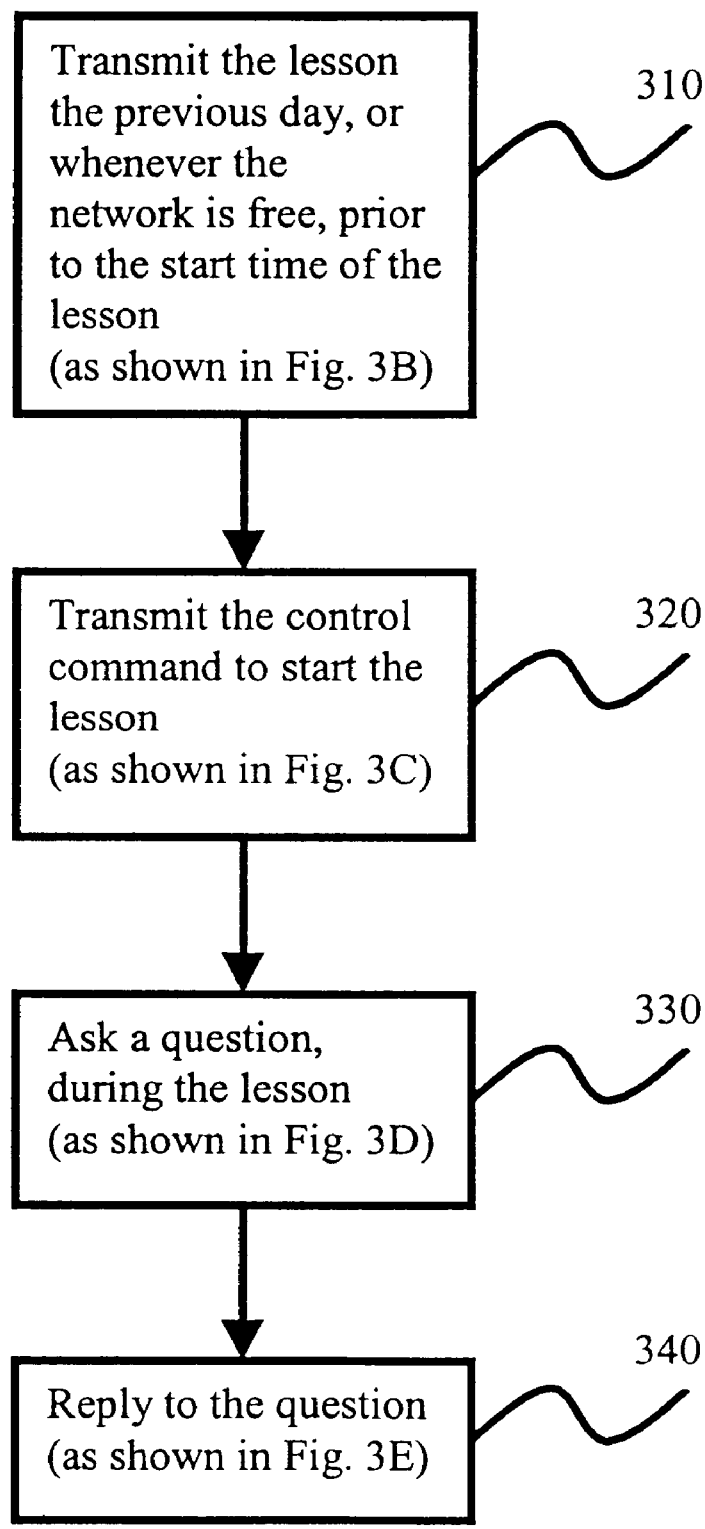
FIG. 3 is a flow diagram of an instance of an interactive class in accordance with the system and method of FIG. 1.
Figure 3B:
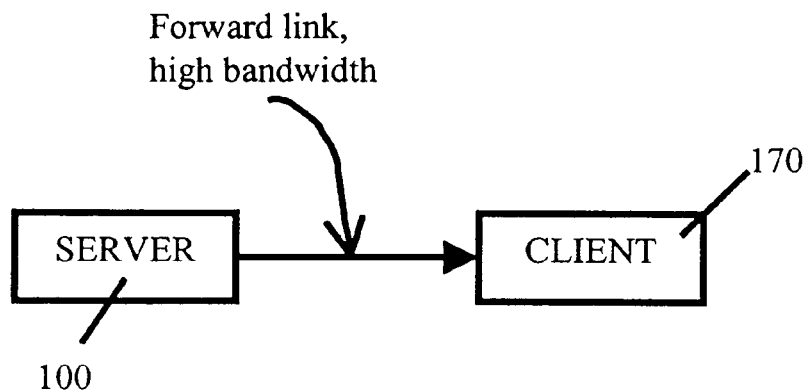
Figure 3C:
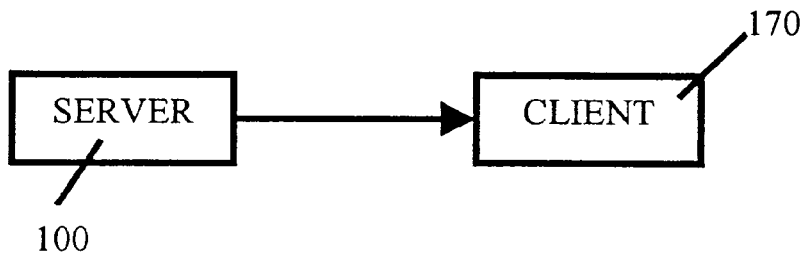
Figure 3D:
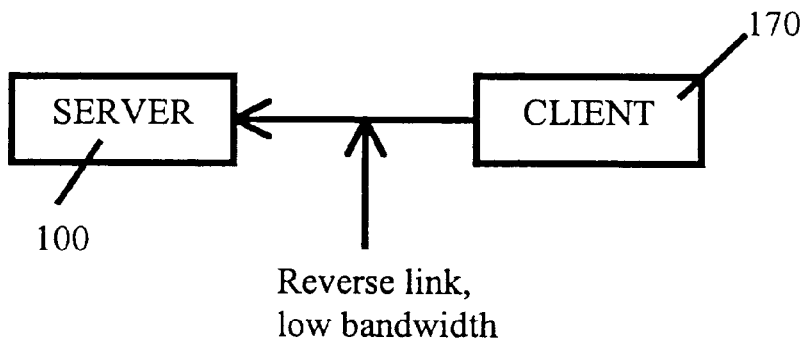
Figure 3E:
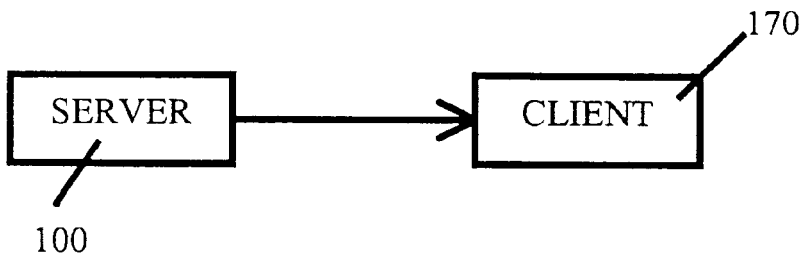

FIG. 3A shows an instance of an interactive class. In step 310, lesson material is transmitted from the server 100 to a client 170 prior to the start time of the lesson. This is shown in FIG. 3B, in which the forward link typically has high bandwidth. As the lesson materials are typically large, the transmission preferentially occurs prior to the lesson at a time when network traffic is low. In step 320, a control command is sent from the server 100 via a high bandwidth forward link to a client 170, shown in FIG. 3C. Step 330 shows interaction between the server 100 and the client 170. A question asked during the lesson is transmitted from the client 170 to the server 100, as shown in FIG. 3D. The reverse link typically requires low bandwidth and may be implemented by a telephone line with a modem. Step 340 shows a reply to the question from step 330. The reply is transmitted from the server 100 on the forward link to the client 170, as shown in FIG. 3E. The reply may include voice clips, typed material and commands to rewind, display or restart parts of the lesson material. If the forward link bandwidth is large, rich multimedia responses may be sent.

Figure 4:
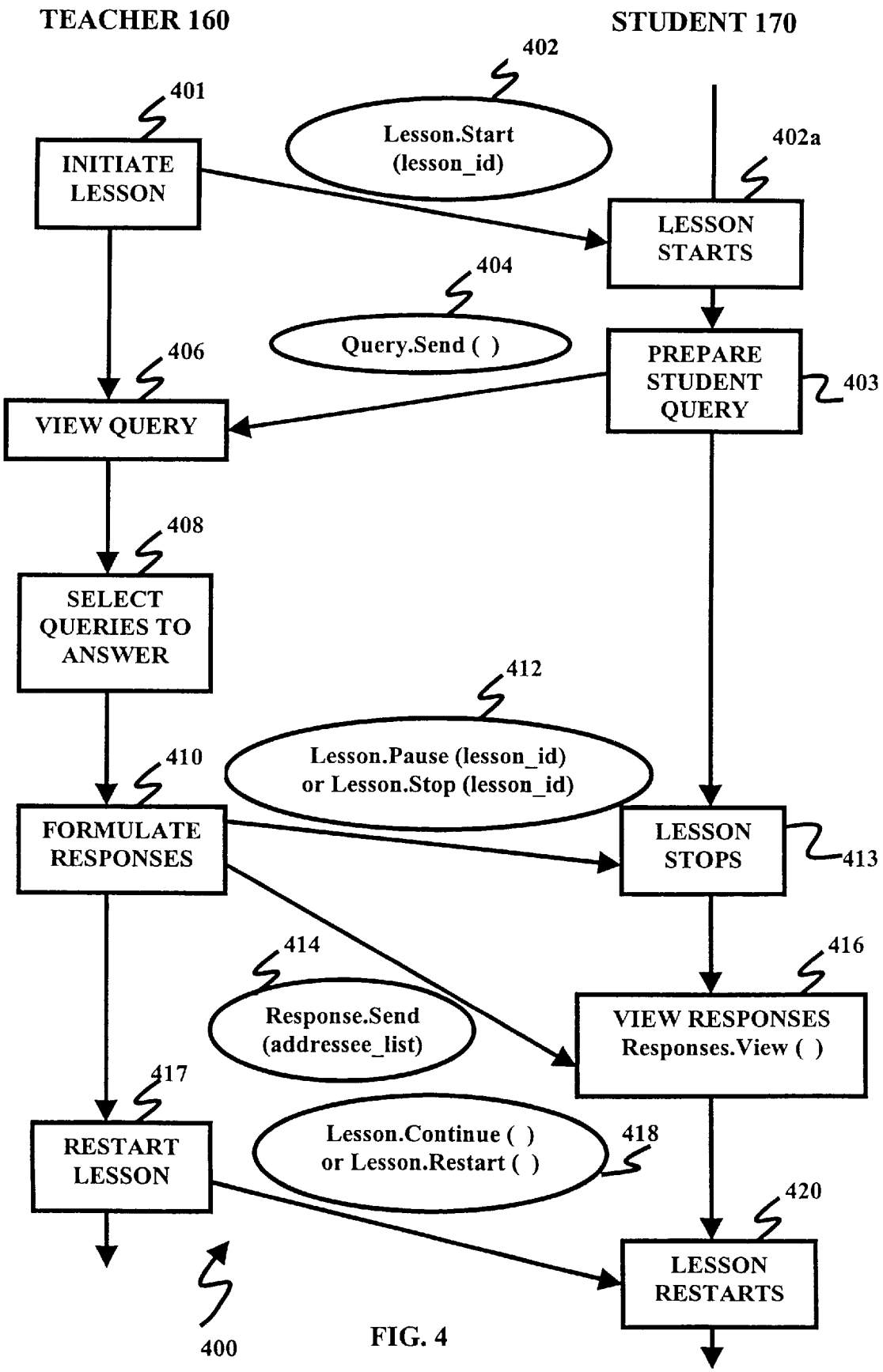
FIG. 4 is a time flow diagram illustrating commands used for conducting the interactive class of FIG. 3.

FIG. 4 is a time flow diagram illustrating commands used for conducting the interactive class of FIG. 3A. Time progresses from the top of the diagram to the bottom of the diagram. Activities performed by an instructor 160 appear on the left hand side of the diagram, whilst activities preformed by a student 170 appear on the right hand side of the diagram. Events are shown in chronological order to illustrate command flow during an interactive class 106.

FIG. 4 shows control commands and user commands that the instructors 160 and students 170 may use to participate in an interactive class 106. Lesson.Star( ) may be explicitly called by the instructor at a designated start time, or may be called by a scheduler residing on the server 100. Similarly, Lesson.Continue( ) and Lesson.Restart( ) may also be called by an instructor 160 or invoked by a scheduler.

A class is initiated in step 401 by an instructor 160 or a scheduler residing on the server 100 issuing a Lesson.Start command 402 to students 170. On reciept of the command 402 by students 170, the lesson begins 402a. If a student 170 has a query, the student 170 prepares the query in step 403 and transmits the query to the instructor 160 in step 404 using Query.Send( ). During the course of the class, the instructor 160 views in step 406 all queries received via step 404 and selects the queries to answer in step 408. The instructor 160 formulates responses in step 410 and stops or pauses the lesson by sending a Lesson.Pause( ) or Lesson.Stop( ) command the students 170 in step 412. When the students receive a Lesson.Pause( ) or Lesson.Stop( ) command, the lesson stops 413. Having formulated the response in step 410, the instructor 160 transmits the response to the students 170 using Response.Send( ) in step 414. The student 170 views the response from the instructor 160 using Responses.View( ) in step 416. When sufficient time has passed for students 170 to view the instructor's 160 response, the instructor 160 continues or restarts the lesson in step 418 using Lesson.Continue( ) or Lesson.Restart( ).

The responses transmitted from the instructor 160 may be sent to one or more of the students 170 and the recipients are determined in the parameter addressee_list. The commands in FIG. 4 are merely illustrative and other commands may exist for replaying some or part of lessons, interrupting for special lessons and skipping sections of a lesson.

Embodiments of the present invention enable high quality distance education to occur in low bandwidth settings. Interactive multimedia virtual classes are provided which enable students to interact with teachers and peers. Multimedia content transmitted to students prior to commencement of the class, preferably during non-peak usage hours of the network, is able to be controlled by instructors 160 or a central server computer 100. In this manner, multimedia-rich lessons are able to be delivered in low bandwidth environments to provide high quality distance education.

INDUSTRIAL APPLICABILITY

It is apparent from the above that the embodiment(s) of the invention are applicable to the field of distance education.

The foregoing describes only one embodiment/some embodiments of the present invention, and modifications and/or changes can be made thereto without departing from the scope and spirit of the invention, the embodiment(s) being illustrative and not restrictive.

What is claimed is:

1. A method for distance education via a computer network comprising the steps of:
   receiving signals from one or more instructor entities, the signals including lesson material, the lesson material designated as belonging to one or more interest groups;
   sending when network usage is low all relevant and in lesson material in advance of a scheduled class time to student entities listed in one or more of the interest groups to which the lesson material is designated as belonging;
   receiving signals from one or more student entities requesting admission to a particular class; and
   sending instructions to student entities to control the display and excution of the lesson material.

2. The method as claimed in claim 1, comprising the further step of:
   receiving signals from one or more student entities, the signals expressing interest to attend virtual classes of one or more particular categories.

3. The method as claimed in claim 1, further comprising the step of:
   storing interest groups, the interest groups including names of students interested in a particular category.

4. The method as claimed in claim 1, further comprising the step of:
   receiving instructions from one or more instructor entities to remotely control the display and execution of the lesson material.

5. The method as claimed in claim 1, wherein the signals received from one or more instructor entities include scheduled dates and times for virtual classes.

6. The method as claimed in claim 1, comprising the further steps of:
   receiving questions from one or more student entities;
   forwarding the questions to one or more instructor entities;
   receiving responses from one or more instructor entities; and
   sending the responses to one or more student entities.

7. The method as claimed in claim 6, wherein the questions are voice based.

8. The method as claimed in claim 6, wherein the questions are text based.

9. The method as claimed in claim 6, wherein the questions are video based.

10. The method as claimed in claim 6, wherein the responses are voice based.

11. The method as claimed in claim 6, wherein the responses are text based.

12. The method as claimed in claim 6, wherein the responses are video based.

13. The method as claimed in claim 6, wherein the responses are instructions to control the display and execution of the lesson material.

14. The method as claimed in claim 5, comprising the further step of:
    sending notification messages about virtual classes to student entities in an interest group for which a virtual class is scheduled.

15. The method as claimed in claim 1, comprising the further steps of:
    encrypting the lesson material sent to said student entities; and
    transmitting to the student entities a decryption key to activate the lesson material.

16. The method as claimed in claim 15, comprising the further step of:
    controlling activation of the lesson material possessed by the student entities by sending decryption keys.

17. The method as claimed in claim 1, comprising the further steps of:
    receiving requests from student entities for a class to be held at a particular time; and
    scheduling of the virtual class so that timetabling constraints of student and instructor entities are met.

18. The method as claimed in claim 1, comprising the further step of:
    controlling activation of lesson material possessed by the student entities by sending control commands that require low bandwidth.

19. The method as claimed in claim 1, comprising the further steps of:
    interacting by a student entity with at least one of the instructor and student entities by sending and receiving voice, text, graphics or control commands.

20. The method as claimed in claim 19, wherein the interacting step is facilitated by a computer server.

21. The method as claimed in claim 19, wherein the interacting step is moderated by a computer server.

22. The method as claimed in claim 1, comprising the further step of:
    charging the student on a per-usage basis for accessing the lesson material.

23. An apparatus for distance education via a computer network comprising:
    means for receiving signals from one or more instructor entities, the signals including lesson material, the lesson material designated as belonging to one or more interest groups;

means for sending when network usage is low all relevant and in lesson material in advance of a scheduled class time to student entities listed in one or more of the interest groups to which the lesson material is designated as belonging;

means for receiving signals from one or more student entities requesting admission to a particular class; and means for sending instructions to student entities to control the display and execution of the lesson material.

24. The apparatus as claimed in claim 23, further comprising:

means for receiving signals from one or more student machines, the signals expressing interest to attend virtual classes of one or more particular categories.

25. The apparatus as claimed in claim 23, further comprising:

means for storing interest groups, the interest groups including names of student entities interested in a particular category.

26. The apparatus as claimed in claim 23, further comprising:

means for receiving instructions from one or more instructor entities to remotely control the display and execution of lesson material.

27. The apparatus as claimed in claim 23, wherein the signals received from one or more instructor entities include scheduled dates and times for virtual classes.

28. The apparatus as claimed in claim 23, further comprising:

means for receiving questions from one or more student entities;

means for forwarding the questions to one or more instructor entities;

means for receiving responses from one or more instructor entities; and means for sending the responses to one or more student entities.

29. The apparatus as claimed in claim 28, wherein the means for receiving questions is adapted to receive voice based questions.

30. The apparatus as claimed in claim 28, wherein the means for receiving questions is adapted to receive text based questions.

31. The apparatus as claimed in claim 28, wherein the means for receiving questions is adapted to receive video based questions.

32. The apparatus as claimed in claim 28, wherein the means for receiving responses is adapted to receive voice based responses.

33. The apparatus as claimed in claim 28, wherein the means for receiving responses is adapted to receive text based responses.

34. The apparatus as claimed in claim 28, wherein the means for receiving responses is adapted to receive video based responses.

35. The apparatus as claimed in claim 28, wherein the means for receiving responses is adapted to receive responses which are instructions to control the display and execution of the lesson material.

36. The apparatus as claimed in claim 27, further comprising:

means for sending notification messages about virtual classes to student entities in an interest group for which a virtual class is scheduled.

37. The apparatus as claimed in claim 23, further comprising:

means for encrypting the lesson material to be sent to said student entities; and means for transmitting to the student entities a decryption key to activate the lesson material.

38. The apparatus as claimed in claim 37, further comprising:

means for controlling activation of the lesson material possessed by the student entities by sending decryption keys.

39. The apparatus as claimed in claim 23, further comprising:

means for receiving requests from student entities for a class to be held at a particular time; and means for scheduling the class so that timetabling constraints of student and instructor entities are met.

40. The apparatus as claimed in claim 23, further comprising:

means for controlling release of lesson material possessed by the student entities by sending control commands that require low bandwidth.

41. The apparatus as claimed in claim 23, further comprising:

means for enabling interaction by a student entity with at least one of the instructor and student entities by sending and receiving voice, text, graphics or control commands.

42. The apparatus as claimed in claim 41, wherein the means for enabling interaction is implemented by a computer server.

43. The apparatus as claimed in claim 41, wherein the means for enabling interaction is adapted so as to be moderated by a computer server.

44. The apparatus as claimed in claim 23, further comprising:

means for charging the student on a per-usage basis for accessing the lesson material.

45. A computer program having a computer usable medium having a computer readable program code means embodied therein for distance education via a computer network, said computer program product comprising:

computer readable program code means for receiving signals from one or more instructor entities, the signals including lesson material, the lesson material designated as belonging to one or more interest groups;

computer readable program code means for sending when network usage is low all relevant and in lesson material in advance of a scheduled class time to student entities listed in one or more of the interest groups to which the lesson material is designated as belonging;

computer readable program code means for receiving signals from one or more student entities requesting admission to a particular class; and computer readable program code means for sending instructions to student entities to control the display and execution of the lesson material.

46. The computer program product of claim 45, further comprising:

computer readable program code means for receiving signals from one or more student machines, the signals expressing interest to attend virtual classes of one or more particular categories.

47. The computer program product of claim 45, further comprising:

computer readable program code means for storing interest groups, the interest groups including names of student entities interested in a particular category.

48. The computer program product of claim 45, further comprising:

computer readable program code means for receiving instructions from one or more instructor entities to remotely control the display and execution of lesson material.

49. The computer program product of claim 45, wherein the signals received from one or more instructor entities include scheduled dates and times for virtual classes.

50. The computer program product of claim 45, further comprising:

computer readable program code means for receiving questions from student entities;

computer readable program code means for forwarding the questions to one or more instructor entities;

computer readable program code means for receiving responses from one or more instructor entities; and computer readable program code means for sending the responses to one or more student entities.

51. The computer program product of claim 50, wherein the computer readable program code means for receiving questions is adapted to receive voice based questions.

52. The computer program product of claim 50, wherein the computer readable program code means for receiving questions is adapted to receive text based questions.

53. The computer program product of claim 50, wherein the computer readable program code means for receiving questions is adapted to receive video based questions.

54. The computer program product of claim 50, wherein the computer readable program code means for receiving responses is adapted to receive voice based responses.

55. The computer program product of claim 50, wherein the computer readable program code means for receiving responses is adapted to receive text based responses.

56. The computer program product of claim 50, wherein the computer readable program code means for receiving responses is adapted to receive video based responses.

57. The computer program product of claim 50, wherein the computer readable program code means for receiving responses is adapted to receive responses which are instructions to control the display and execution of the lesson material.

58. The computer program product of claim 49, further comprising:

computer readable program code means for sending notification messages about virtual classes to student entities in an interest group for which a virtual class is scheduled.

59. The computer program product of claim 45, further comprising:

computer readable program code means for encrypting the lesson material to be sent to said student entities; and computer readable program code means for transmitting to the student entities a decryption key to activate the lesson material.

60. The computer program product of claim 59, further comprising:

computer readable program code means for controlling activation of the lesson material possessed by the student entities by sending decryption keys.

61. The computer program product of claim 45, further comprising:

computer readable program code means for receiving requests from student entities for a class to be held at a particular time; and computer readable program code means for scheduling the class so that timetabling constraints of student and instructor entities are met.

62. The computer program product of claim 45, further comprising:

computer readable program code means for controlling release of lesson material possessed by the student entities by sending control commands that require low bandwidth.

63. The computer program product of claim 45, further comprising:

computer readable program code means for enabling interaction by a student entity with at least one of the instructor and student entities by sending and receiving voice, text, graphics or control commands.

64. The computer program product of claim 63, wherein the computer readable program code means for enabling interaction is implemented by a computer server.

65. The computer program product of claim 63, wherein the computer readable program code means for enabling interaction is adapted so as to be moderated by a computer server.

66. The computer program product of claim 45, further comprising:

computer readable program code means for charging the student on a per-usage basis for accessing the lesson material.

* * * * *